United States Patent
Alkhalifah et al.

(10) Patent No.: US 9,645,273 B2
(45) Date of Patent: May 9, 2017

(54) METHOD OF SEMI-PERMEABLE TERRAIN GEOPHYSICAL DATA ACQUISITION

(71) Applicants: Tariq Ali Mohammed Alkhalifah, Thuwal (SA); Khaled Faraj Rashdan Almutairi, Riyadh (SA); Faisal Mojari Almotiri, Riyadh (SA)

(72) Inventors: Tariq Ali Mohammed Alkhalifah, Thuwal (SA); Khaled Faraj Rashdan Almutairi, Riyadh (SA); Faisal Mojari Almotiri, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 0 days.

(21) Appl. No.: 15/149,180

(22) Filed: May 9, 2016

(65) Prior Publication Data

US 2016/0252641 A1    Sep. 1, 2016

Related U.S. Application Data

(62) Division of application No. 12/870,864, filed on Aug. 30, 2010, now Pat. No. 9,335,432.

(51) Int. Cl.
| | |
|---|---|
| *G01D 18/00* | (2006.01) |
| *G01V 3/08* | (2006.01) |
| *G01V 3/15* | (2006.01) |
| *G01V 3/17* | (2006.01) |
| *G06F 11/30* | (2006.01) |

(52) U.S. Cl.
CPC ............ *G01V 3/08* (2013.01); *G01V 3/15* (2013.01); *G01V 3/17* (2013.01)

(58) Field of Classification Search
None
See application file for complete search history.

(56) References Cited

U.S. PATENT DOCUMENTS 8,770,140 B2 *   7/2014   Nielsen ............... G06Q 10/06
                                                     118/663
8,836,336 B2 *   9/2014   Campbell ............ G01V 3/12
                                                     324/365

\* cited by examiner

*Primary Examiner* — Phuong Huynh
(74) *Attorney, Agent, or Firm* — Ray Abhyanker, P.C.

(57) ABSTRACT

A method, a system and an apparatus of semi-permeable terrain geophysical data acquisition is disclosed. In one embodiment, a method of geophysical data acquisition over a semi-permeable terrain includes placing an apparatus housing geophysical data measuring instruments over a semi-permeable terrain. The method adjusts and calibrates low frequency unshielded dipole antennas with a transmitter and a receiver in a pre-determined interval distance depending on central frequency. The method selects a time data trigger type and/or a unit data trigger type to scan and/or trace where a data signal is sent to a ground at selected intervals. The method causes a linear movement of the apparatus over the semi-permeable terrain. The method determines an optimal position for geophysical data acquisition over the semi-permeable terrain. Further, the method captures geophysical data with measuring instruments housed on the apparatus.

20 Claims, 7 Drawing Sheets

PROCESS FLOW
750

METHOD OF SEMI-PERMEABLE TERRAIN GEOPHYSICAL DATA ACQUISITION

CLAIM OF PRIORITY

This application is a Divisional and Continuation in Part application of and claims priority from U.S. application Ser. No. 12/870,864 titled SEMI-PERMEABLE TERRAIN GEOPHYSICAL DATA ACQUISITION filed on Aug. 30, 2010.

FIELD OF TECHNOLOGY

This disclosure relates generally to a technical field of transportation devices and, in one example embodiment, to a system, method and an apparatus of semi-permeable terrain geophysical data acquisition.

BACKGROUND

A semi-permeable terrain may include a sandy surface, a surface covered with snow, a surface made up of a loosely associated permeable substance, a surface whose topology is formed in peaks and troughs in an unknown, unpredictable, or undiscoverable pattern, and/or a surface composed of naturally occurring granular material composed of finely divided rock and mineral particles. For example, a semi-permeable terrain may be a desert (e.g., Sahara desert), a snow covered surface (e.g., an Arctic and/or Antarctic surface), a Martian surface, and/or a beach, etcetera.

An entity such as an individual, scientist, university, company, and/or institution etcetera may decide to gather geophysical measurements related to a semi-permeable terrain. These measurements may include data related to the semi-permeable terrain's depth, height, pressure, weight, distance, surface thickness, and/or surface elevation etcetera.

An apparatus housed with data gathering instruments may be placed on and may move across a semi-permeable terrain to capture such measurements. As the apparatus moves across the semi-permeable terrain, it may sink into or get stuck in the terrain. The surface height consistency of the data gathering instruments may also be affected by erratic and unpredictable movements of the apparatus. In addition, the apparatus may not move with a constant speed over a horizontal distance on the semi-permeable terrain, thus making surface data measurements imprecise and inaccurate.

Erratic and unpredictable movement of the apparatus may cause the vertical displacement of data gathering instruments due to the natural physical characteristics of a semi-permeable terrain. Inconsistent movement over a semi-permeable terrain may also produce noise in the geophysical data. The quality of geophysical data measurements may thus be negatively affected as the captured data may be inaccurate, erroneous, imprecise, inexact, vague, invalid, and/or flawed.

SUMMARY

A method, a system and an apparatus of semi-permeable terrain geophysical data acquisition is disclosed.

In one aspect, a method of geophysical data acquisition over a semi-permeable terrain includes placing an apparatus housing geophysical data measuring instruments over a semi-permeable terrain. The method adjusts and calibrates low frequency unshielded dipole antennas with a transmitter and a receiver in a pre-determined interval distance depending on central frequency. The method selects a time data trigger type and/or a unit data trigger type to scan and/or trace where a data signal is sent to a ground at selected intervals. The method causes a linear movement of the apparatus over the semi-permeable terrain. The method determines an optimal position for geophysical data acquisition over the semi-permeable terrain. Further, the method captures geophysical data with measuring instruments housed on the apparatus.

The selected intervals may be 0.03 seconds when the time data trigger type is selected. The selected intervals may be 0.01 meters when the unit data trigger type is selected. The geophysical data may be converted from a time domain to a horizontal distance and/or a horizontal distance to a time domain. The method may automatically adjust and/or calibrating the geophysical data related to a characteristic of the semi-permeable terrain using the geophysical data measuring instruments. The captured geophysical data may accurately reflect a magnitude of a measurement related to a motion of the apparatus. The method may generate a heat energy from sunlight using an electric device comprising an array of packaged and/or interconnected assembly of photovoltaic cells. The electric device is housed in a hollowed interior cavity of a front extension of the apparatus. The electric device may be coupled to a propulsion system and an electric motor. The electric motor may be coupled to a set of wheels of the apparatus. The heat energy may drive the linear movement of the apparatus using the set of wheels coupled to the electric motor. The method may image a subsurface of the semi-permeable terrain using the low frequency unshielded dipole antennas.

The apparatus may comprise a front extension with a set of front stability margins coupled to a rear extension with a set of rear stability margins. The set of front stability margins may be part of a base of the front extension and contiguous therewith. Each of the set of front stability margins may be formed along a length of the base of the front extension with a length of a front stability margin of the set being substantially parallel to a length of another front stability margin of the set. The set of rear stability margins may be horizontally parallel to and extend vertically from a base of the rear extension (e.g., each of the set of rear stability margins may also be contiguous with the base of the rear extension and the rear extension). The set of front stability margins and the set of rear stability margins may both sink at least 5 centimeters into the semi-permeable terrain during motion of the apparatus.

In another aspect, a method of geophysical data acquisition over a semi-permeable terrain includes placing an apparatus housing geophysical data measuring instruments over a semi-permeable terrain; adjusting and calibrating low frequency unshielded dipole antennas with a transmitter and a receiver in a pre-determined interval distance depending on central frequency; transmitting a data signal into a surface of the semi-permeable terrain at selected intervals using the transmitter (e.g., the data signal permeates the semi-permeable terrain and is reflected back to the surface); selecting at least one of a time data trigger type and a unit data trigger type to at least one of scan and trace the reflected data signal; receiving the reflected data signal using the receiver; recording the reflected data signal as a trace at a point on the surface; processing the reflected data signal to obtain a geophysical data; causing a linear movement of the apparatus over the semi-permeable terrain; determining an optimal position for geophysical data acquisition over the semi-permeable terrain; and capturing geophysical data with measuring instruments housed on the apparatus.

In yet another aspect, a method of geophysical data acquisition over a semi-permeable terrain includes placing an apparatus housing geophysical data measuring instruments over a semi-permeable terrain; adjusting and calibrating low frequency unshielded dipole antennas with a transmitter and a receiver in a pre-determined interval distance depending on central frequency; selecting at least one of a time data trigger type and a unit data trigger type to trace where a data signal is sent to a ground at selected intervals; constructing a scan comprising a two dimensional image from at least one trace; causing a linear movement of the apparatus over the semi-permeable terrain; determining an optimal position for geophysical data acquisition over the semi-permeable terrain; and capturing geophysical data with measuring instruments housed on the apparatus.

The methods, system, and/or apparatuses disclosed herein may be implemented in any means for achieving various aspects, and may be executed in a form of machine readable medium embodying a set of instruction that, when executed by a machine, causes the machine to perform any of the operations disclosed herein. Other aspects will be apparent from the following description and the appended claims.

BRIEF DESCRIPTION OF THE VIEWS OF DRAWINGS

Example embodiments are illustrated by way of example and not limitation in the figures of accompanying drawings, in which like references indicate similar elements and in which.

Other features of the present embodiments will be apparent from accompanying Drawings and from the Detailed Description that follows.

DETAILED DESCRIPTION

Disclosed are a system, a method and an apparatus of semi-permeable terrain geophysical data acquisition is disclosed. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 3:
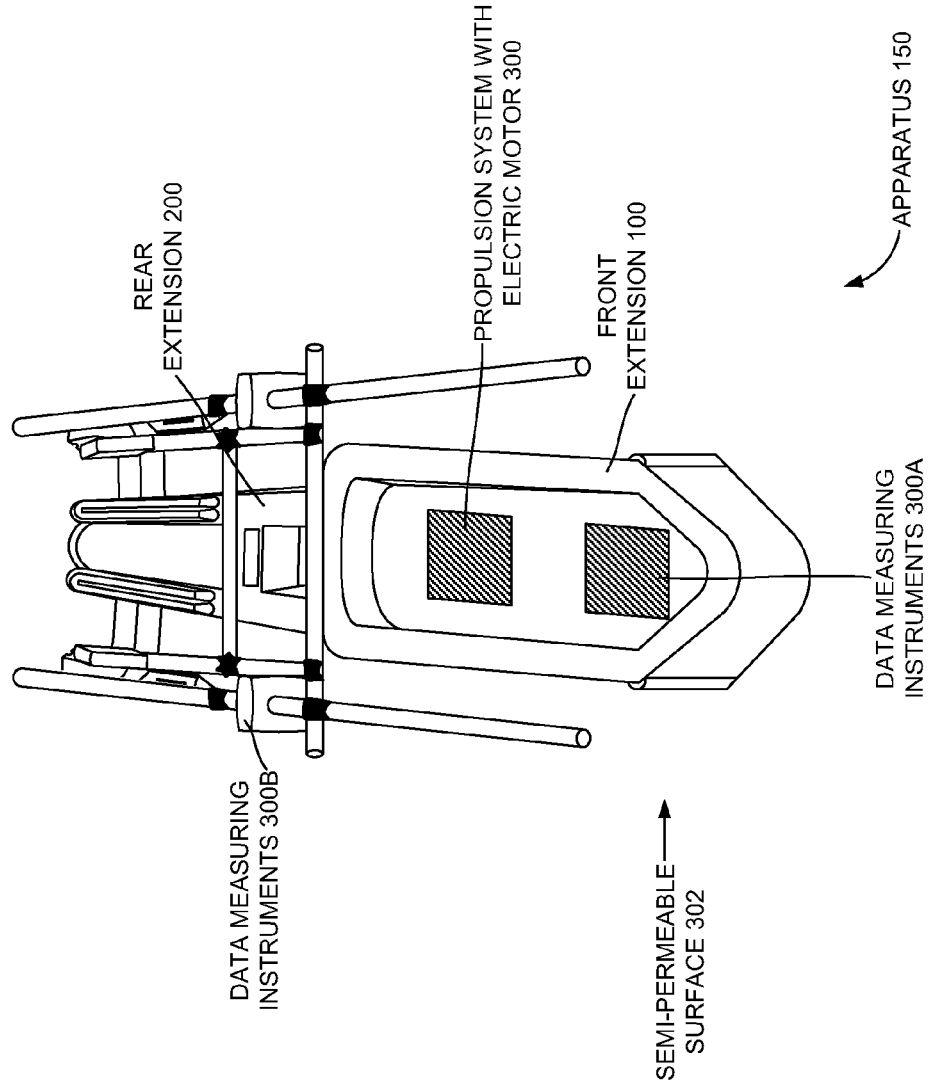
FIG. 3 is a perspective front view of the apparatus, according to one or more embodiments.
Figure 4:
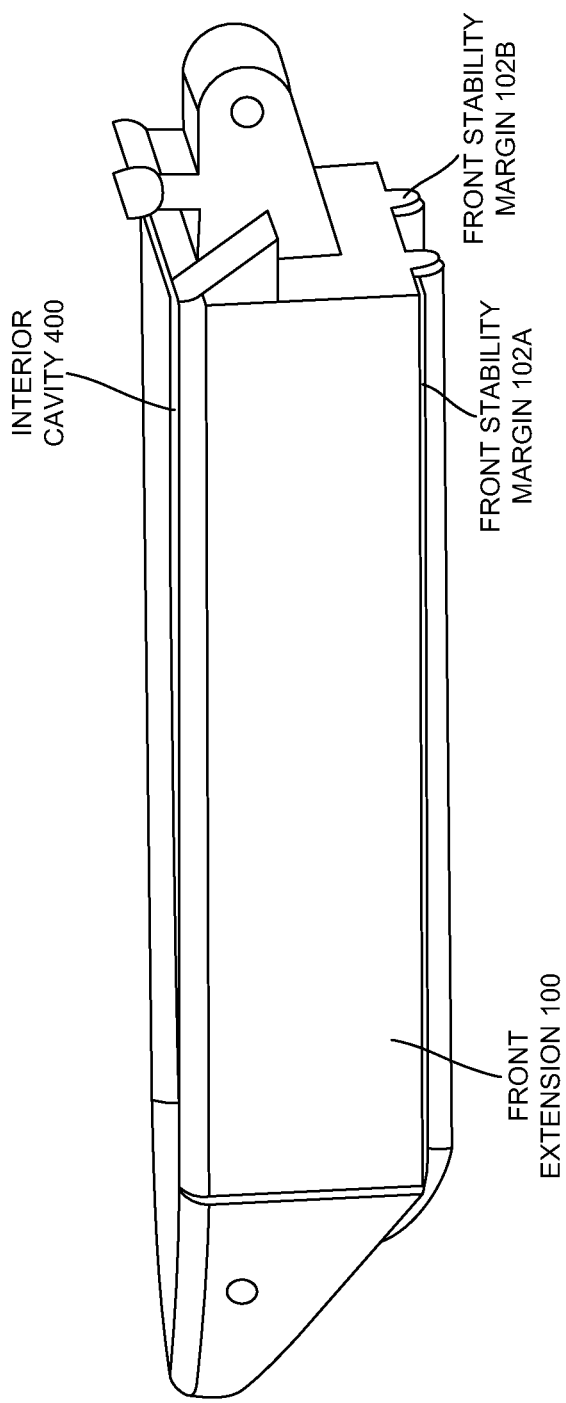
FIG. 4 is a perspective side view of the front extension of the apparatus, according to one or more embodiments.

In one embodiment, a method of geophysical data acquisition over a semi-permeable terrain includes placing an apparatus 150 of FIG. 3 housing geophysical data measuring instruments (e.g., data measuring instruments 300 of FIG. 3) over a semi-permeable terrain (e.g., semi-permeable surface 302 of FIG. 3). The method adjusts and calibrates low frequency unshielded dipole antennas of the apparatus 150 with a transmitter and a receiver in a pre-determined interval distance depending on central frequency. The method selects a time data trigger type and/or a unit data trigger type to scan and/or trace where a data signal is sent to a ground at selected intervals using the data measuring instruments 300. The method causes a linear movement of the apparatus 150 over the semi-permeable terrain (e.g., the semi-permeable surface 302). The method determines an optimal position for geophysical data acquisition (using the data measuring instruments 300) over the semi-permeable terrain (e.g., the semi-permeable surface 302). Further, the method captures geophysical data with measuring instruments (e.g., data measuring instruments 300) housed on the apparatus 150.

The selected intervals may be 0.03 seconds when the time data trigger type is selected. The selected intervals may be 0.01 meters when the unit data trigger type is selected. The geophysical data may be converted from a time domain to a horizontal distance and/or a horizontal distance to a time domain. The method may automatically adjust and/or calibrating the geophysical data related to a characteristic of the semi-permeable terrain (e.g., the semi-permeable surface 302) using the geophysical data measuring instruments (e.g., data measuring instruments 300). The captured geophysical data may accurately reflect a magnitude of a measurement related to a motion of the apparatus 150. The method may generate a heat energy from sunlight using an electric device comprising an array of packaged and/or interconnected assembly of photovoltaic cells. The electric device is housed in a hollowed interior cavity of a front extension 100 of the apparatus 150. The electric device may be coupled to a propulsion system and an electric motor. The electric motor may be coupled to a set of wheels of the apparatus 150. The heat energy may drive the linear movement of the apparatus 150 using the set of wheels coupled to the electric motor. The method may image a subsurface of the semi-permeable terrain (e.g., the semi-permeable surface 302) using the low frequency unshielded dipole antennas.

The apparatus 150 of FIG. 3 may comprise a front extension 100 with a set of front stability margins 102 102 coupled to a rear extension with a set of rear stability margins 202. The set of front stability margins 102 102 may be part of a base of the front extension 100 and contiguous therewith. Each of the set of front stability margins 102 102 may be formed along a length of the base of the front extension 100 with a length of a front stability margin of the set being substantially parallel to a length of another front stability margin of the set. The set of may be horizontally parallel to and extend vertically from a base of the rear extension (e.g., each of the set of may also be contiguous with the base of the rear extension and the rear extension). The set of front stability margins 102 102 and the set of may both sink at least 5 centimeters into the semi-permeable terrain (e.g., the semi-permeable surface 302) during motion of the apparatus 150.

In another embodiment, a method of geophysical data acquisition (using the data measuring instruments over a semi-permeable terrain (e.g., the semi-permeable surface 302 of FIG. 3) includes placing an apparatus 150 housing geophysical data measuring instruments (e.g., data measuring instruments 300) over a semi-permeable terrain (e.g., the semi-permeable surface 302); adjusting and calibrating low frequency unshielded dipole antennas with a transmitter and a receiver in a pre-determined interval distance depending on central frequency; transmitting a data signal into a surface of the semi-permeable terrain (e.g., the semi-permeable surface 302) at selected intervals using the transmitter (e.g., the data signal permeates the semi-permeable terrain (e.g., the semi-permeable surface 302) and is reflected back to the surface); selecting at least one of a time data trigger type and a unit data trigger type to at least one of scan and trace the reflected data signal; receiving the reflected data signal using the receiver; recording the reflected data signal as a trace at a point on the surface; processing the reflected data signal to obtain a geophysical data; causing a linear movement of the apparatus 150 over the semi-permeable terrain (e.g., the semi-permeable surface 302); determining an optimal position for geophysical data acquisition (using the data measuring instruments (e.g., data measuring instruments 300) over the semi-permeable terrain (e.g., the semi-permeable surface 302); and capturing geophysical data with measuring instruments (e.g., data measuring instruments 300) housed on the apparatus 150.

In yet another embodiment, a method of geophysical data acquisition (using the data measuring instruments (e.g., data measuring instruments 300 of FIG. 3) over a semi-permeable terrain (e.g., the semi-permeable surface 302) includes placing an apparatus 150 housing geophysical data measuring instruments (e.g., data measuring instruments 300) over a semi-permeable terrain (e.g., the semi-permeable surface 302); adjusting and calibrating low frequency unshielded dipole antennas with a transmitter and a receiver in a pre-determined interval distance depending on central frequency; selecting at least one of a time data trigger type and a unit data trigger type to trace where a data signal is sent to a ground at selected intervals; constructing a scan comprising a two dimensional image from at least one trace; causing a linear movement of the apparatus 150 over the semi-permeable terrain (e.g., the semi-permeable surface 302); determining an optimal position for geophysical data acquisition (using the data measuring instruments (e.g., data measuring instruments 300) over the semi-permeable terrain (e.g., the semi-permeable surface 302); and capturing geophysical data with measuring instruments (e.g., data measuring instruments 300) housed on the apparatus 150.

Embodiments described herein are directed to an apparatus 150 that is configured to house a set of data measuring instruments 300A-B. The apparatus 150 may be designed to carry the housed data measuring instruments 300A-B in a semi-permeable terrain. Examples of semi-permeable terrain may include, but not limited to, a desert, a snow covered surface, and a surface made of loosely associated permeable substances. In one or more embodiments, the set of data measuring instruments 300A-B may be a part of the apparatus 150. In one or more embodiments, the set of data measuring instruments may be configured to automatically adjust and calibrate geophysical data related to characteristic of a semi-permeable terrain such that a measurement captured through the set of the data measuring instruments accurately reflects a magnitude of a measurement related to a motion of the apparatus 150.

The set of data measuring instruments 300A-B may be carried to gather geophysical information. Examples of data measuring instruments include, but are not limited to, a low frequency Ground Penetrating Radar (GPR), and a Differential Global Positioning System (e.g., transportable DGPS reference station). In one or more embodiments, the apparatus 150 may be designed to carry the set of data measuring instruments 300A-B to gather geophysical measurements related to a semi-permeable terrain. The apparatus 150 may also be configured to carry equipments to acquire data for other geophysical methods, for example Magnetometer of Magnetic methods, or some of electromagnetic instruments along the semi-permeable terrain with continuous reading mode based on study area environment (e.g., flat marine).

Figure 1:
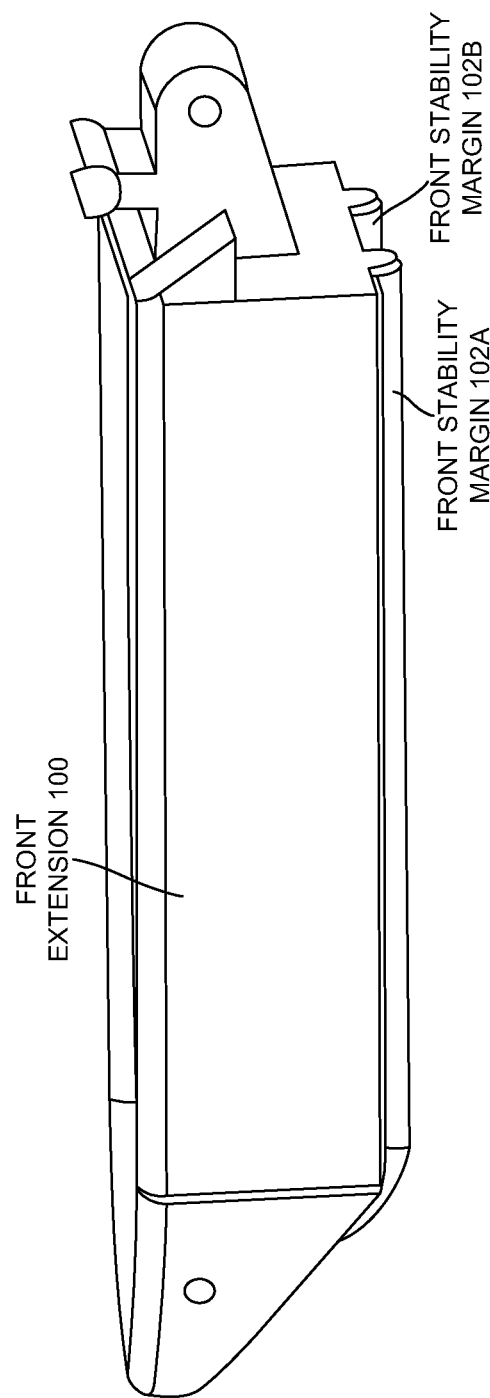
FIG. 1 is a perspective side view of a front extension of an apparatus, according to one or more embodiments.
Figure 2:
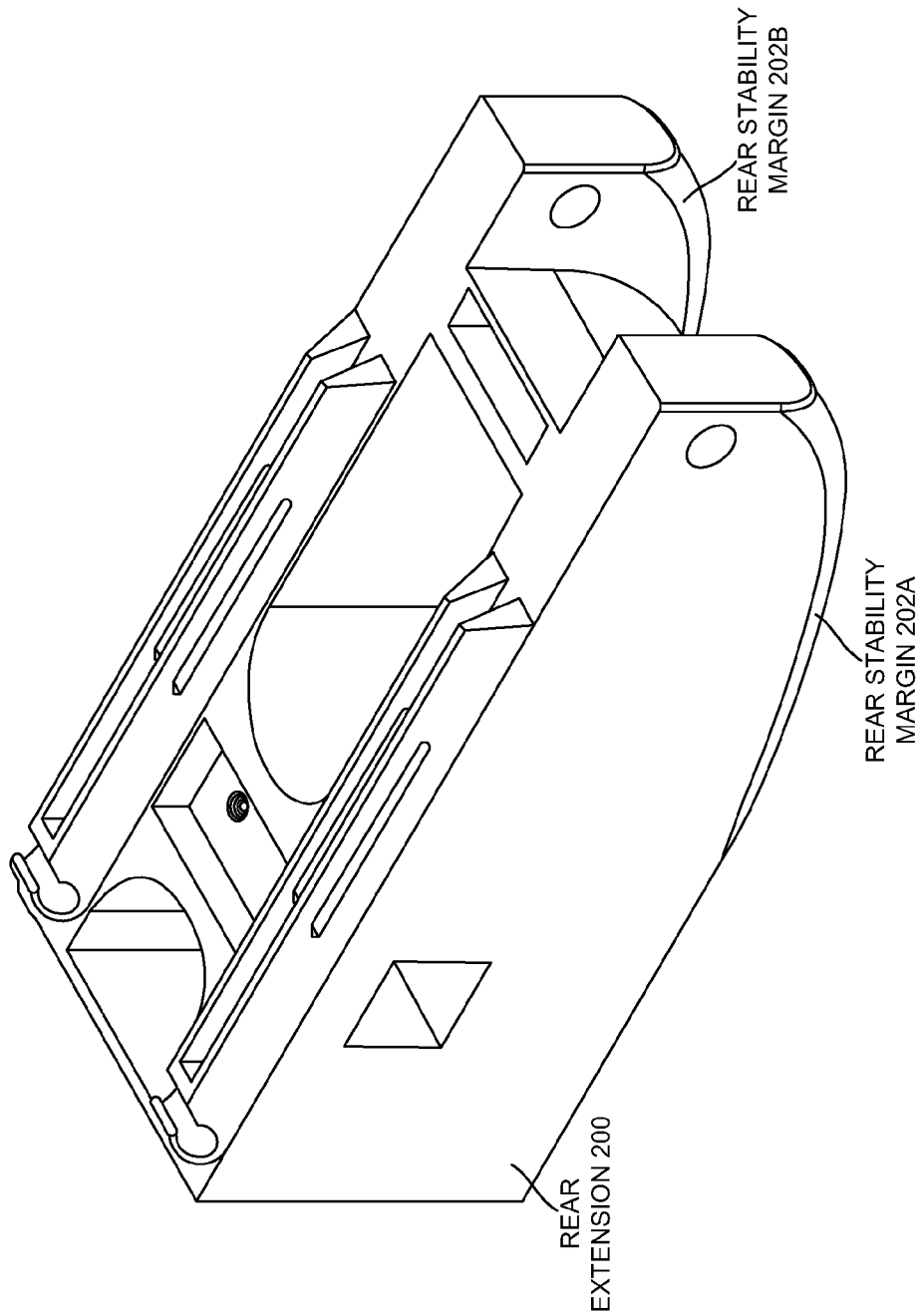
FIG. 2 is a perspective side view of a rear extension of the apparatus, according to one or more embodiments.

In one or more embodiments, the apparatus 150 may be designed with a front extension 100 and a rear extension 200. The front extension 100 of the apparatus 150 may include a set of front stability margins 102A-B. A side view of the front extension 100 is illustrated in FIG. 1. Also, the rear extension 200 of the apparatus 150 may include a set of rear stability margins 202A-B. A side view of the rear extension 200 is illustrated in FIG. 2.

In one or more embodiments, the front extension 100 may be designed to provide sufficient space to house the data measuring instruments 300A. In other words, the front extension 100 may be designed with an interior cavity 400 to house the set of data measuring instruments 300A-B. In one example embodiment as illustrated in Figures, the front extension 100 may be designed to enable movement of the apparatus 150 in the semi-permeable terrain with relatively less friction. In one or more embodiments, the front stability margins 102A-B in the front extension 100 are designed as a part of a base of the front extension 100 of the apparatus 150. The front stability margins 102A-B are designed in the base such that the front stability margins 102A-B face the surface of the terrain. In one or more embodiments, the front stability margins 102A-B in the front extension 100 of the apparatus 150 may be designed such that the front stability margins 102A-B are horizontally parallel to each other and extend vertically from a base of front extension 100. In one or more embodiments, the stability margins are designed such that the front stability margins 102A-B sink approximately 5 centimeters into the semi-permeable surface 302 (e.g., sand surface) during a motion of the apparatus 150.

In one or more embodiments, the rear stability margins 202A-B in the rear extension 200 form a bulk portion of the rear extension 200. In one embodiment, the rear stability margins 202A-N are horizontally parallel to and extend vertically from a base of the rear extension 200. Similar to the front stability margins 102A-B of front extension 100, the rear stability margins 202A-B of the rear extension 200 are designed to sink approximately 5 centimeters into the semi-permeable surface 302 during a motion of the apparatus 150.

In one or more embodiments, the front stability margins 102A-B and 202A-B are designed for stability of the apparatus 150. In one or more embodiments, the front stability margins 102A-B and 202A-B are designed such that the front stability margins 102A-B and 202A-B are projected from the bases as a part of the design. In one or more embodiments, the front stability margins 102A-B and 202A-B are designed such to sink by 5 cm in sand surface, to maintain the lateral balance of the apparatus 150 while towing.

Figure 5:
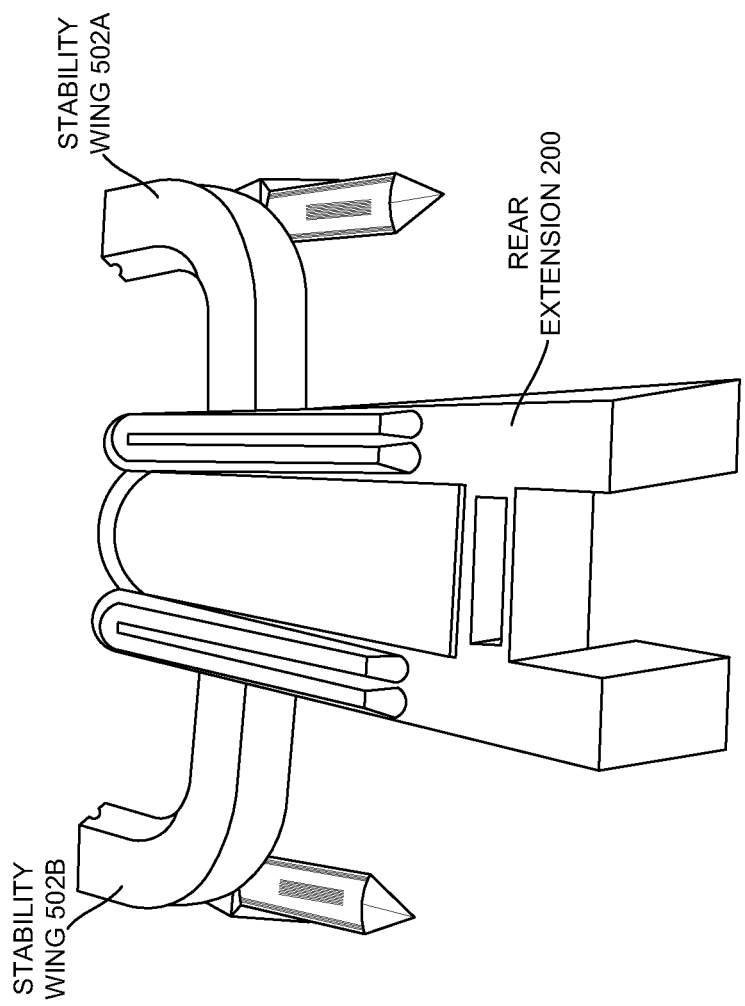
FIG. 5 is a perspective front view of the rear extension of the apparatus, according to one or more embodiments.

The rear extension 200 of the apparatus 150 may include a set of stability wings 502A-B coupled on either sides of the rear extension 200 to provide stability and balance to the apparatus 150 while in motion. In one or more embodiments, the set of stability wings 502A-B affixed to the rear extension 200 are designed to touch the surface of the semi-permeable surface 302 to provide lateral stability to the apparatus 150. The stability wings 502A-B are illustrated in FIG. 5. The stability wings 502A-B may be coupled to the sides of the rear extension 200 to provide stability to the apparatus 150. In one or more embodiments, the rear extension 200 may include space for housing batteries for power supply.

The front extension 100 of the apparatus 150 may be coupled to the rear extension 200 through a coupling means.

Figure 6:
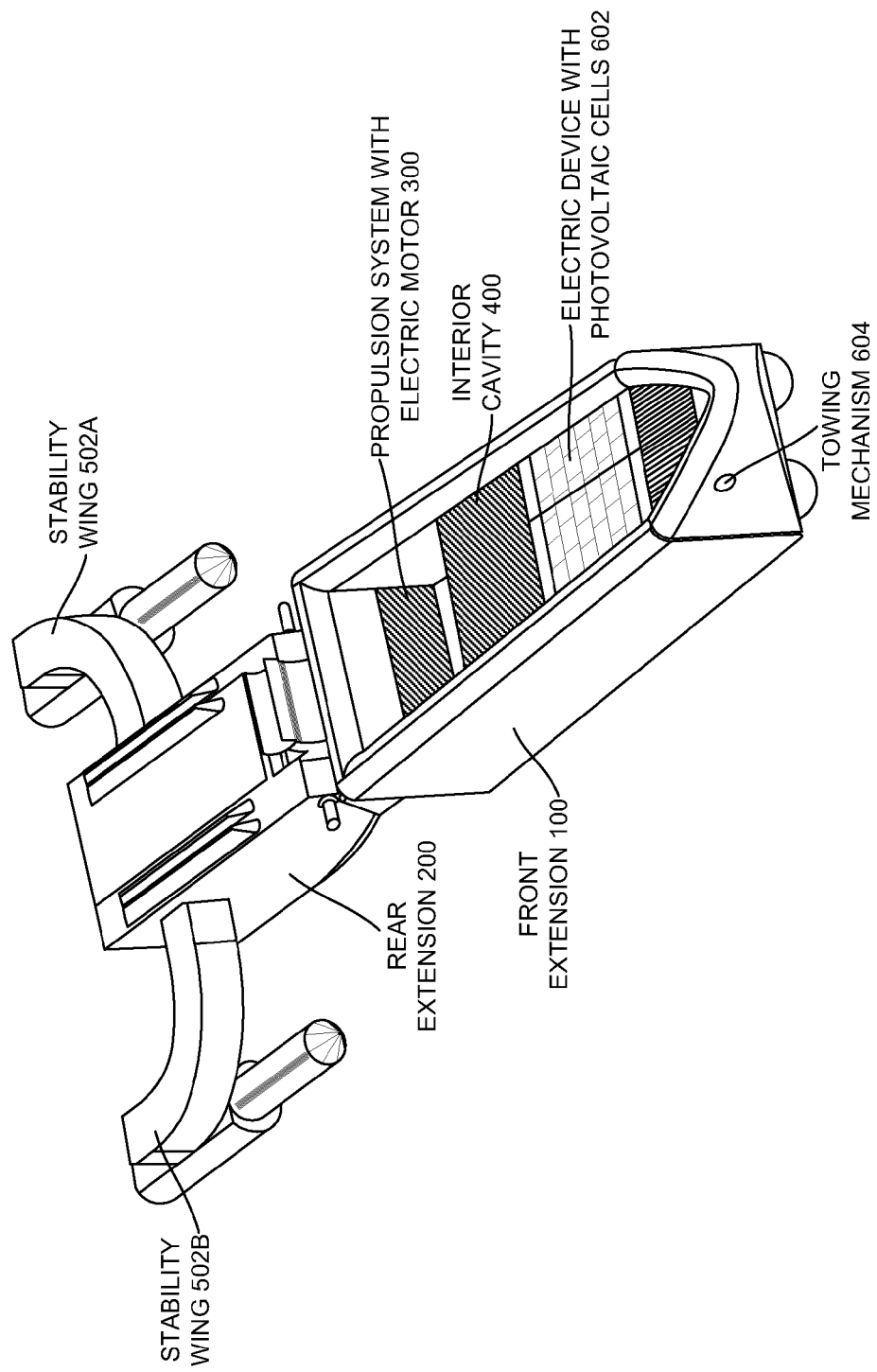
FIG. 6 is a perspective view of the apparatus, according to one or more embodiments.

In one or more embodiments, a coupling means may be provided at a rear end of the front extension 100 and a front end of the rear extension 200 to couple the extensions. In one embodiment, the coupling means may be a cross connector. The apparatus 150 with the front extension 100 and the rear extension 200 is illustrated in FIG. 6.

In one or more embodiments, towing may be performed using a suitable motorized vehicle capable of pulling the apparatus 150. In one or more embodiments, towing may be performed by a bike at a relatively constant speed. The apparatus 150 may include a towing mechanism 604 for enabling towing. In one example embodiment, small apertures may be provided as a towing mechanism 604 at a front end of the front extension 100 through which a suitable connector such as a strong rope or metallic chain may be used to tie the apparatus 150 to the vehicle for towing. Towing mechanism 604 for the apparatus 150 as an example is illustrated in FIG. 6.

In one or more embodiments, the apparatus 150 may also be designed to be self powered for movements. In one or more embodiments, the front extension 100 may include a space or the interior cavity 400 that is designed to hold electric devices. In one or more embodiments, an electric device may include an array of packaged and interconnected assembly of photovoltaic cells 602 to generate energy. In one or more embodiments, the packaged and interconnected assembly of photovoltaic cells 602 may be coupled to a propulsion system and an electric motor 306 being placed in at the rear end of the interior cavity 400 of the front extension 100. The energy generated by the photovoltaic cells 602 may be used by the propulsion system and the electric motor 306 to propel the apparatus 150 in the semi-permeable surfaces. In one or more embodiments, a set of wheels may be provided and coupled to the electric motor through a mechanism (e.g., gears, belt driven or direct driven) to drive the movement of the apparatus 150. The propulsion system with electric motor 306 in the apparatus 150 is illustrated in FIG. 3. The propulsion system with propulsion system, electric motor 306, and electrical device with photovoltaic cells 602 housed in the apparatus 150 are illustrated in FIG. 6.

In one or more embodiments, the data measuring instruments 300A-B may be mounted on the apparatus 150 at locations provided thereof. In one or more embodiments, the GPR low frequency antennas (e.g., dipole antenna) 300B may be mounted on sides of the apparatus 150 (e.g., as illustrated in FIG. 3). In one or more embodiments, the GPR may be used to image the subsurface of the semi-permeable terrain. In one or more embodiments, the DGPS may be mounted in the front extension 100. In one or more embodiments, the DGPS may be configured to obtain DGPS measurements of the elevation changes along any semi-permeable terrain profiles with continuous reading mode. Similarly, other data measuring instruments 300B may be mounted at appropriate places provided thereof.

The apparatus 150 with the data measuring apparatuses mounted may be used for geophysical data acquisition over a semi-permeable terrain. The data measuring instruments 300A-B may be calibrated and adjusted for generating accurate measurement. An example of GPR low frequency antenna for acquiring subsurface information in the semi-permeable terrain is provided for illustration. In one or more embodiments, GPR low frequency antennas (e.g., the unshielded dipole antennas) with a transmitter and receiver in a pre-determined interval distance depending on central frequency. In other words, a low frequency antenna (with low frequencies from 20 to 200 MHz) may be calibrated for a pre-determined distance with specified depth of sound with a required resolution. In one or more embodiments, direction of the survey for obtaining geophysical data may be pre-determined on maps with known coordinates. In one or more embodiments, the direction control of the apparatus 150 may be performed using an appropriate instrument.

Furthermore, a set of geophysical data may be obtained through the GPR low frequency antenna using steps as described below. In one or more embodiments, in step 1, a trigger type may be selected to scan or trace (e.g., the reflected signals) where the data signal is sent to the ground at selected intervals. In one or more embodiments, the trigger type may be a time based trigger or a distance based trigger.

In time based triggering, the data measuring instruments 300A-B may be configured to transmit the data signal through the transmitter for pre-determined intervals of time (e.g., 0.03 sec) while the apparatus 150 is moved at a relatively constant speed from start point to end point of profile (e.g., pre-determined location). The reflected signal may be traced and scanned to convert the GPR data from time domain to horizontal distance.

In distance based triggering, the data measuring instruments 300A-B may be configured to transmit the data signal through the transmitter for every at pre-determined intervals of distance (for example 0.01 m) while the apparatus 150 is continuously moved from a start point to an end point of profile (e.g., pre-determined location).

In one or more embodiments, the recording and receiving the reflected data signal over a period of time is called as trace. In one or more embodiments, a scan may be a two dimensional image construction from one or more traces. In one or more embodiments, in step 2, an optimal position for geophysical data acquisition over a semi-permeable terrain may be determined. In one or more embodiments, in step 3, the data signal (e.g., electromagnetic wave) is radiated from a transmitter (e.g., a transmitting antenna) of the data measuring instrument to the surface of the semi-permeable terrain. The radiated wave travels into the ground, hits variety of objects and is reflected and/or scattered back to the surface, traveling at a velocity that is determined by the permittivity (e) of material in the semi-permeable terrain.

In one or more embodiments, in step 4, the reflected data signal may be received by the receiver (e.g., a receiving antenna) of the apparatus 150 and processed for obtaining geographical information. In one or more embodiments, in step 5, the received energy (e.g., signal) may be recorded as a trace at a point on the surface. The aforementioned transmission may be performed and a set of traces may be obtained for a pre-determined interval distance or pre-determined interval time.

In one or more embodiments, the data measuring instrument in the apparatus 150 may be towed for the pre-determined interval distance or the pre-determined interval time to perform aforementioned steps. In other words, a linear movement of the apparatus 150 housing the apparatus 150 may be caused over the semi-permeable terrain to enable the data measuring instruments 300A-B to perform aforementioned steps at pre-determined interval distance or at the pre-determined interval time. The obtained traces may be converted to scans to obtain subsurface information of the sub-permeable terrain. Furthermore, the geophysical data may be captured using the geophysical data measuring instruments 300A-B housed on the apparatus 150. In one or more embodiments, the set of data measuring instruments 300A-B may be configured to automatically adjust and calibrate geophysical data related to a characteristic of the semi-permeable terrain such that a measurement captured through the set of data measuring instruments accurately reflects a magnitude of a measurement related to the motion of the apparatus 150.

In one or more embodiments, the apparatus 150 may be made of light weight material, preferably a fiber material or a plastic material with sled-like features adopted for transporting sensitive devices over semi-permeable terrain such as sand dunes. The fiber or plastic material may be preferred as compared to metals because the use of metals for the apparatus 150 may disturb the GPR in data acquisition as well as other magnetic based data measuring instruments. The use of light weight material such as fiber or plastics for the apparatus 150 may provide better mobility as compared to metal body.

The apparatus 150 as illustrated in Figures is designed for efficient and stable mobility on semi-permeable surface 302 such as sand dunes surfaces for the purpose of acquiring geophysical data. In one or more embodiments, the apparatus 150 may be a modular design where the front extension 100 and the rear extension 200 can be coupled or separated when required. In addition, the coupling feature for the front extension 100 and the rear extension 200 may be designed such that the front extension 100 and the rear extension 200 can be bent towards/against each other at the coupling point to enable easy movement in semi-permeable terrain.

The apparatus 150 with the stability wings 502A-B that is placed on the surface of the sand with a fixed weight provides balance and stability to the apparatus 150. The design of the apparatus 150 enables placing the transmitter and receiver of the data measurement instruments in the apparatus 150 at a same distance from the ground.

Furthermore, the apparatus 150 design may be optimized to carry devices like GPR or DGPS for data acquisition in semi-permeable conditions over large geophysical distances. The apparatus 150 may reduce a time required for acquiring geophysical data as a surveyor has to acquire the geophysical surveys through the data measuring instruments by carrying the data measuring instruments manually. As a result, the apparatus 150 may reduce the burden of the surveyor of carrying the equipment and travel over a long distance in an unsuitable environment conditions such as in deserts and sand dunes.

In addition, the apparatus 150 may not generate noise as compared to previous systems which involved cars or trucks thereby improving data measurement instrument performance. Furthermore, the apparatus 150 eliminates a need of special system of trucks that move to gather data with specified design for data acquisition, thereby eliminating expenses caused by the previous systems.

Figure 7:
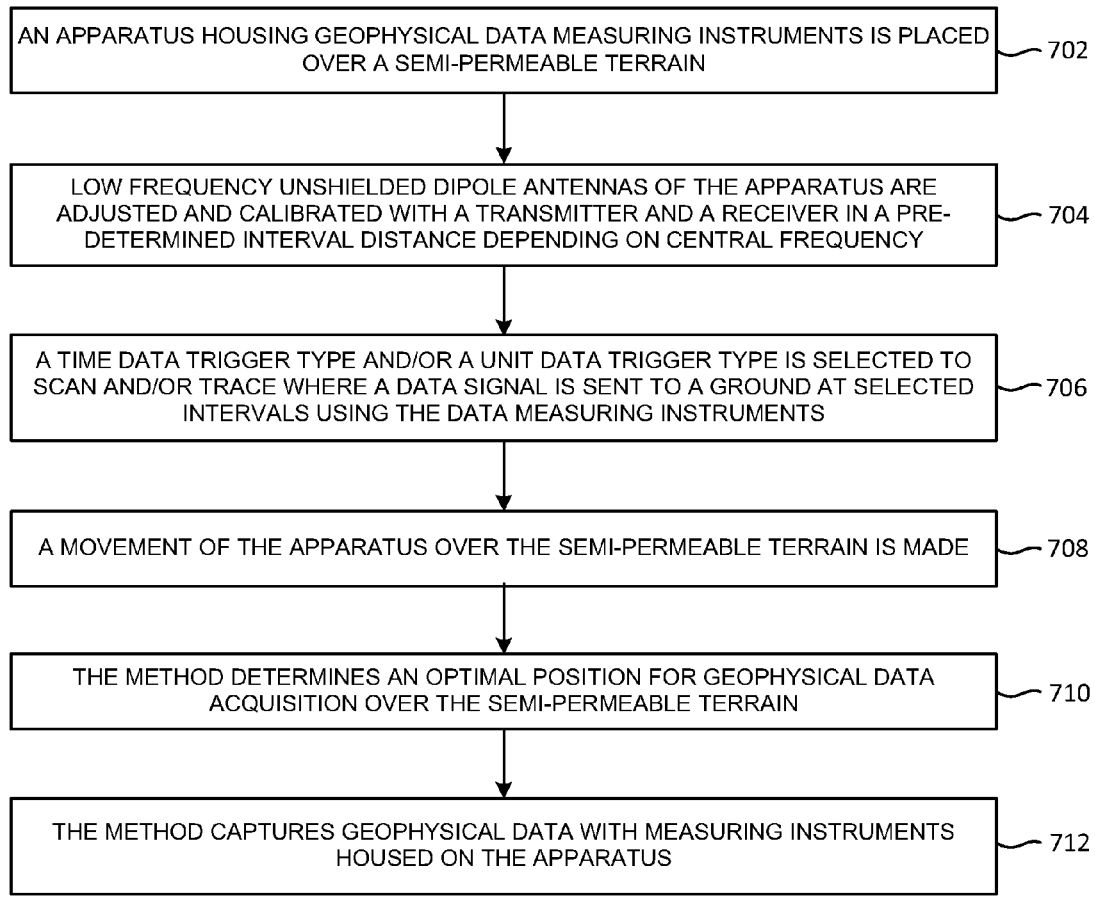
FIG. 7 is a process flow describing a method of geophysical data acquisition over a semi-permeable terrain, according to one embodiment.

FIG. 7 is a process flow 750 describing a method of geophysical data acquisition over a semi-permeable terrain, according to one embodiment. In operation 702, an apparatus 150 of FIG. 3 housing geophysical data measuring instruments (e.g., data measuring instruments 300 of FIG. 3) is placed over a semi-permeable terrain (e.g., semi-permeable surface 302 of FIG. 3). In operation 704, low frequency unshielded dipole antennas of the apparatus 150 are adjusted and calibrated with a transmitter and a receiver in a predetermined interval distance depending on central frequency. In operation 706, a time data trigger type and/or a unit data trigger type is selected to scan and/or trace where a data signal is sent to a ground at selected intervals using the data measuring instruments 300.

Then, in operation 708, a movement of the apparatus 150 over the semi-permeable terrain (e.g., the semi-permeable surface 302) is made. Next, in operation 710, the method determines an optimal position for geophysical data acquisition (using the data measuring instruments 300) over the semi-permeable terrain (e.g., the semi-permeable surface 302). In operation 712, the method captures geophysical data with measuring instruments (e.g., data measuring instruments 300) housed on the apparatus 150.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. A method of geophysical data acquisition over a semi-permeable terrain comprising:
    placing an apparatus housing geophysical data measuring instruments over a semi-permeable terrain;
    adjusting and calibrating low frequency unshielded dipole antennas with a transmitter and a receiver in a predetermined interval distance depending on central frequency;
    selecting at least one of a time data trigger type and a unit data trigger type to at least one of scan and trace where a data signal is sent to a ground at selected intervals;
    causing a linear movement of the apparatus over the semi-permeable terrain;
    determining an optimal position for geophysical data acquisition over the semi-permeable terrain; and
    capturing geophysical data with measuring instruments housed on the apparatus.

2. The method of claim 1, wherein the selected intervals are 0.03 seconds when the time data trigger type is selected.

3. The method of claim 1, wherein the selected intervals are 0.01 meters when the unit data trigger type is selected.

4. The method of claim 1, further comprising converting the geophysical data from at least one of a time domain to a horizontal distance and a horizontal distance to a time domain.

5. The method of claim 1, further comprising automatically adjusting and calibrating the geophysical data related to a characteristic of the semi-permeable terrain using the geophysical data measuring instruments.

6. The method of claim 1, wherein the captured geophysical data accurately reflects a magnitude of a measurement related to a motion of the apparatus.

7. The method of claim 1, further comprising:
    generating a heat energy from sunlight using an electric device comprising an array of packaged and interconnected assembly of photovoltaic cells,
        wherein the electric device is housed in a hollowed interior cavity of a front extension of the apparatus,
        wherein the electric device is coupled to a propulsion system and an electric motor,
        wherein the electric motor is coupled to a set of wheels of the apparatus, and
        wherein the heat energy drives the linear movement of the apparatus using the set of wheels coupled to the electric motor.

8. The method of claim 1, further comprising imaging a subsurface of the semi-permeable terrain using the low frequency unshielded dipole antennas.

9. The method of claim 1:
    wherein the apparatus comprises a front extension with a set of front stability margins coupled to a rear extension with a set of rear stability margins, wherein the set of front stability margins is part of a base of the front extension and contiguous therewith, each of the set of front stability margins being formed along a length of the base of the front extension with a length of a front stability margin of the set being substantially parallel to a length of another front stability margin of the set, wherein the set of rear stability margins is horizontally parallel to and extends vertically from a base of the rear extension, each of the set of rear stability margins also being contiguous with the base of the rear extension and the rear extension, and wherein the set of front stability margins and the set of rear stability margins both sink at least 5 centimeters into the semi-permeable terrain during motion of the apparatus.

10. A method of geophysical data acquisition over a semi-permeable terrain comprising:

placing an apparatus housing geophysical data measuring instruments over a semi-permeable terrain;

adjusting and calibrating low frequency unshielded dipole antennas with a transmitter and a receiver in a pre-determined interval distance depending on central frequency;

transmitting a data signal into a surface of the semi-permeable terrain at selected intervals using the transmitter, wherein the data signal permeates the semi-permeable terrain and is reflected back to the surface;

selecting at least one of a time data trigger type and a unit data trigger type to at least one of scan and trace the reflected data signal;

receiving the reflected data signal using the receiver;

recording the reflected data signal as a trace at a point on the surface;

processing the reflected data signal to obtain a geophysical data;

causing a linear movement of the apparatus over the semi-permeable terrain;

determining an optimal position for geophysical data acquisition over the semi-permeable terrain; and capturing geophysical data with measuring instruments housed on the apparatus.

11. The method of claim 10, wherein the selected intervals are 0.03 seconds when the time data trigger type is selected.

12. The method of claim 10, wherein the selected intervals are 0.01 meters when the unit data trigger type is selected.

13. The method of claim 10, further comprising converting the geophysical data from at least one of a time domain to a horizontal distance and a horizontal distance to a time domain.

14. The method of claim 10, further comprising automatically adjusting and calibrating the geophysical data related to a characteristic of the semi-permeable terrain using the geophysical data measuring instruments.

15. The method of claim 10, wherein the captured geophysical data accurately reflects a magnitude of a measurement related to a motion of the apparatus.

16. A method of geophysical data acquisition over a semi-permeable terrain comprising:

placing an apparatus housing geophysical data measuring instruments over a semi-permeable terrain;

adjusting and calibrating low frequency unshielded dipole antennas with a transmitter and a receiver in a pre-determined interval distance depending on central frequency;

selecting at least one of a time data trigger type and a unit data trigger type to trace where a data signal is sent to a ground at selected intervals;

constructing a scan comprising a two dimensional image from at least one trace;

causing a linear movement of the apparatus over the semi-permeable terrain;

determining an optimal position for geophysical data acquisition over the semi-permeable terrain; and capturing geophysical data with measuring instruments housed on the apparatus.

17. The method of claim 16, wherein the selected intervals are 0.03 seconds when the time data trigger type is selected.

18. The method of claim 16, wherein the selected intervals are 0.01 meters when the unit data trigger type is selected.

19. The method of claim 16, further comprising converting the geophysical data from at least one of a time domain to a horizontal distance and a horizontal distance to a time domain.

20. The method of claim 16, further comprising automatically adjusting and calibrating the geophysical data related to a characteristic of the semi-permeable terrain using the geophysical data measuring instruments.

* * * * *